United States Patent Office 3,441,388
Patented Apr. 29, 1969

3,441,388
EFFERVESCENT COMPOUNDS AND PROCESS
FOR PRODUCING SAME
Kenneth W. Knapp, Palo Alto, Calif., and Michael J.
McCarthy, Fanwood, and Leonard R. Darbee,
Trenton, N.J., assignors to FMC Corporation, New
York, N.Y., a corporation of Delaware
No Drawing. Filed Dec. 14, 1965, Ser. No. 513,856
Int. Cl. C09k 3/00; C01b 15/00
U.S. Cl. 23—315                                    7 Claims

ABSTRACT OF THE DISCLOSURE

Effervescent compounds are produced by suspending particles of (1) alkali metal, alkaline earth metal or ammonium persulfates, perphosphates or percarbonates, (2) alkali metal, alkaline earth metal or ammonium salts of a polybasic acid or (3) amines, amides or imides that have hydrogen peroxide hydrogen-bonded thereto in a stream of inert gas, maintaining the average distance between the particles at least 0.07 times the diameter of the particles and heating the particles to a temperature of from 40° to 300° C. until evolved water has been removed.

---

This invention relates to a group of novel compounds which effervesce when placed in water and further to a novel process for manufacturing these compounds which have this effervescent property.

Certain perborate-derived compounds that give off gaseous oxygen when placed in water or other similar solvents, e.g., alcohol, are known. In general these compounds are produced by heating perborate salts in conventional reaction flasks or in rotary containers, water vapor being removed during the conversion. Prior workers also found that the reaction can be enhanced by heating under vacuum or by passing a dry, inert gas or air over the heated mass to facilitate removal of water vapor. This technique, which has been used on a laboratory scale for converting perborate compounds, e.g., sodium perborate, has not been effective in producing other compounds that effervesce when placed in water.

It is an object of the present invention to produce a new class of compounds capable of effervescing in water and which have uniform "gaseous oxygen" contents.

It is a further object to produce these novel compounds, capable of effervescing in water, by means of a simple and readily workable process in which these compounds can be produced rapidly and efficiently.

We have found that certain compounds, namely, certain salts of true peroxyacids, and certain salts containing hydrogen peroxide of crystallization, and all compounds of the class of amines, amides or imides which have hydrogen peroxide hydrogen-bonded thereto, can be converted to products which effervesce and give off gaseous oxygen when in contact with water by suspending particles of these compounds in a stream of inert gas and maintaining the average distance between the particles at least about 0.07 times the diameter of the particles, heating these compounds while in a suspended state to a temperature of from about 40 to about 300° C., but below the melting point of the particles during the conversion until any water evolved during conversion has been removed, and recovering a product having uniform amounts of "gaseous oxygen" which effervesces when in contact with water.

The salts of true peroxyacids which are operable are those whose cation may be either an alkali metal, ammonium or an alkaline earth metal and whose anion may be either a mono- or dipersulfate, perphosphate or percarbonate; the salts containing hydrogen peroxide of crystallization which are operable are those salts that contain hydrogen peroxide in their crystalline structure and whose cation may be an alkaline earth metal, ammonium or an alkali metal and whose anion is derived from a polybasic acid; the amines, amides and imides which have hydrogen peroxide hydrogen-bonded thereto include urea peroxide, melamine peroxide, acetamide peroxide, succinimide peroxide, and uretane peroxide.

The term "gaseous oxygen" as used in the specification refers to the oxygen in the peroxygen-derived compound which is liberated as gaseous oxygen when the compound comes in contact with water.

In accordance with the present invention the compounds which can be treated to produce a peroxygen-derived product which effervesce when in contact with water are of three general types. These are:

(a) Salts of true peroxyacids—those inorganic salts whose cation may be either an alkaline earth metal, ammonium, or an alkali metal and whose anion may be either a persulfate, perphosphate, or percarbonate. The term persulfate, perphosphate or percarbonate as used in the specification and claims refers to both the monoperoxy and the diperoxy moiety. Among these compounds may be included potassium peroxymonosulfate, ammonium peroxydisulfate, sodium peroxydisulfate, potassium peroxydisulfate, magnesium peroxydisulfate, calcium peroxydisulfate, sodium peroxymonophosphate, potassium peroxymonophosphate, lithium peroxydiphosphate, sodium peroxydiphosphate, potassium peroxydiphosphate, sodium peroxycarbonate, and potassium peroxycarbonate.

(b) Salts containing hydrogen peroxide of crystallization—those salts of polybasic acids whose cation is either an alkaline earth metal, ammonium or an alkali metal and which contains bound hydrogen peroxide. Among these compounds may be included tertiary ammonium phosphate peroxide, tertiary lithium phosphate peroxide, tertiary sodium phosphate peroxide, tertiary potassium phosphate peroxide, secondary sodium phosphate peroxide, secondary potassium phosphate peroxide, secondary magnesium phosphate peroxide, secondary calcium phosphate peroxide, sodium pyrophosphate peroxide, potassium pyrophosphate peroxide, magnesium pyrophosphate peroxide, calcium pyrophosphate peroxide, sodium tripolyphosphate peroxide, ammonium carbonate peroxide, sodium carbonate peroxide, potassium carbonate peroxide, sodium silicate peroxide, lithium sulfate peroxide, sodium sulfate peroxide, magnesium sulfate peroxide, calcium sulfate peroxide, and sodium oxalate peroxide.

(c) Amines, amides or imides which have hydrogen peroxide hydrogen-bonded thereto—among these compounds may be included urea peroxide, melamine peroxide, acetamide peroxide, succinimide peroxide, and uretane peroxide.

The compounds thus defined above, preferably having a size of less than 2 mm. in diameter, are placed in a vertically positioned hollow tube reactor. An inert gas is then passed upward through the bottom of the tube at a rate sufficient to suspend the particles in the gas stream and to maintain the average distance between the particles at least about 0.07 times the diameter of the particles. The gas used to suspend and separate the particles must be inert both to the initial, suspended particles and to the final, suspended product. Examples of such gases include argon, nitrogen, air, etc.

The resulting suspended mass may then be heated by internal or external means. Internal heating of the particles can be obtained by heating the upward flowing inert gas stream until the desired temperature has been reached. An acceptable external heating method is to heat the tubular reactor by use of a suitable heating jacket so that the suspended particles in the reactor are heated by the transfer of heat through the walls of the reactor.

Heating is carried out at a temperature between 40° and 300° C. so that an acceptable reaction rate is obtained without excessive exotherm. The temperature of the particles in the reactor must never be permitted to go above the melting point of the particles suspended therein. If this occurs the particles will become tacky and will agglomerate; these will then be too heavy to be supported by the suspending gas.

The preferred temperature of conversion of these compounds to the desired product will depend upon the specific compound being converted. For example, a compound such as sodium pyrophosphate peroxide is best converted at a temperature of from about 110° to 130° C. Other compounds such as trisodium phosphate peroxide and sodium carbonate peroxide are best converted at temperatures of 120° to 140° C. and 110° to 120° C., respectively. If one desires to carry out the reaction at higher temperatures, the reaction becomes more highly exothermic. If a reaction at these higher temperatures is desired, the temperature of the reactant should be increased slowly enough to prevent the reaction from becoming overly exothermic so as to run out of control. The exact temperature profile of the reaction will vary depending upon the specific compound employed in the reaction.

In addition to controlling the temperature of the suspended particles, the ambient water vapor content must be maintained below that point at which the water vapor decomposes the peroxygen-derived product. That is, any or all of the water vapor evolved in the reaction, which is carried off by the inert gas, must be removed at a rate sufficient to prevent the water vapor from decomposing the final product. The exact water vapor level which can be tolerated varies with different starting compounds and therefore must be determined for each compound treated. In most cases water vapor concentrations as high as 20 mg./liter can be tolerated without decomposition of the final products. However, in the case of products which are more sensitive to water vapor, the water vapor concentration should be lowered to prevent decomposition of the final product. One such compound which has a high sensitivity to water vapor is sodium persulfate. The water vapor concentration of the inert gas may be controlled either by using higher velocities of the suspending gas thereby dispersing the evolved water vapor into a larger volume of the suspending inert gas or by conducting the reaction at a slower rate to decrease the rate of water vapor evolved.

In order to achieve proper removal of the water vapor from the surface of the suspended particles it is necessary that the discrete particles be separated by an average space of at least about 0.07 times the diameter of the particles. This separation permits the inert gas to sweep away the water evolved during the conversion without having any localized water build-up which can decompose the final product.

In carrying out the reaction it is generally preferred to use an initial reactant having a size of less than 2 mm. in diameter. A preferred particle size is from about 0.1 to about 1.0 mm. in diameter. This particle size can be obtained, if necessary, by a preliminary grinding step. The smaller particles permit better heat exchange in the reactor and facilitate removal of water vapor from the surface of the particles by the upflowing inert gas. Fine grinding increases the surface area of a unit sample of the reactant particle which in turn facilitates the exchange of both heat and water vapor during the ensuing reaction.

The rate of flow of the inert gas should be sufficient to suspend the reactant particles so that the distance between the particles is at least about 0.07 times the diameter of the particles but not sufficient to blow out portions of the charge from the top of the reactor. The rate of flow needed to achieve this will vary considerably depending upon the size and shape of the particle, density of the particle being suspended and the viscosity of the suspending gas. In general a gas flow rate of from 5 to 75 cm./sec. through the reactor has been found satisfactory in maintaining the particles suspended and separated from one another as set forth above.

The present reaction can be operated either batchwise or on a continuous basis. In batch operations a charge of the reactant salt or compound is suspended in the reactor, treated at elevated temperatures for the desired reaction time, e.g., two hours for converting sodium pyrophosphate peroxide at 120° C., and the entire charge is then removed. In continuous operation, the reactant is continually added to a suspended reaction mass in the reactor and the resultant product is continually removed. The rate of addition and the rate of removal from the suspended mass are adjusted, relative to the suspended mass, so that the average residence time of the added reactants is within the prescribed limits, e.g., from about ½ to 20 hours. If desired, more than one reactor can be used by connecting a plurality of these reactors in series so that different stages of the conversion can be run at different temperatures. For example, the initial stage which may be operated at a lower temperature can be carried out in one reactor and subsequent portions of the conversion can be carried out in one or more additional reactors at progressively higher temperature.

In one embodiment of the invention a humidity sensing device is placed in the gas stream above the suspended particles and the temperature of the particles is controlled so that the rate of water evolution, and consequently the relative humidity of the gas stream, does not go above described limits. In general, as the temperature of the particles increases, the rate of reaction, and thus the rate of water evolution, also increases. Thus, one simple and direct method for controlling the water vapor content of the ambient atmosphere of the reaction particles is to control the reaction temperatures.

The instant products are useful in decreasing the dissolving time of solid materials in water. For example, the present effervescent products can be incorporated into solid compacted masses, e.g., detergent tablets, in order to disperse the ingredients in the compact quickly when it is placed in water. The use of these products in admixture with ingredients other than detergents, is also within the contemplated utility thereof.

The following examples are given to illustrate the present invention and are not deemed to be limiting thereof.

Example 1

One hundred fifty grams of finely divided sodium pyrophosphate peroxide, having an active oxygen content of 8.2%, were charged into a 3.2 cm. diameter glass column having a volume of about 540 cc. The column had a heating jacket through which a liquid heat exchange medium could flow. Air was admitted into the column through a fritted glass plate located in the bottom of the column at a rate of 12 cm. per second to suspend the particles of sodium pyrophosphate peroxide which had a maximum diameter of 2 mm. The pyrophosphate charge doubled its volume in the glass column after admission of the air. Warm oil having a temperature of 122° C. was passed through the heating jacket continuously to maintain the temperature within the column at 120° C. The charge of particles was held at this temperature for two hours during which the maximum humidity content of the overhead gas stream was about 17 mg./liter. Thereafter the contents of the column were removed and 120 g. of a free-flowing powder was obtained that effervesced on contact with water. On analysis this product contained 1.4% by weight of gaseous oxygen.

Example 2

One hundred thirty grams of finely divided trisodium phosphate peroxide (active oxygen content of 6.0%) was charged into a 3.2 cm. diameter glass column having a volume of about 450 cc. The column had a heating jacket through which a liquid heat exchange medium could flow. Air was admitted into the column through a fritted glass plate located in the bottom of the column at a rate of 10 cm./sec. to suspend the particles of the charge which had an average diameter of between 0.1 and 1.0 mm. The charge doubled its volume after admission of the air and suspension of the particles. Warm oil having a temperature of 133° C. was then flowed through the jacket continuously to maintain the temperature within the column at 130° C. The charge was held at this temperature for one hour during which the maximum humidity content of the overhead gas stream was about 20 mg./liter. Thereafter the contents of the column were removed and 105 g. of a powdered material was obtained that effervesced on contact with water. On analysis this product contained 1.2% by weight of gaseous oxygen.

Example 3

One hundred fifty grams of finely divided sodium carbonate peroxide (having an active oxygen content of 13.7%) and having a bulk density of 0.85 g./ml. was charged into a 3.2 cm. diameter glass column having a volume of about 415 ml. The column had a heating jacket through which a liquid heat exchange medium could flow. Air was admitted into the column through a fritted glass plate located in the bottom of the column at a rate of 10 cm./sec. to suspend the particles of sodium carbonate peroxide which had an average diameter of less than 2 mm. After admission of the air the volume of charge in the glass column doubled. Warm oil having a temperature of 117° C. was then flowed through the jacket continuously to maintain the temperature within the column at 115° C. The charge was held at this temperature for two hours during which the maximum humidity content of the overhead gas stream was about 17 mg./liter. Thereafter the contents of the column were removed and 110 g. of a fine powder was recovered that effervesced on contact with water. On analysis this product contained 1.2% by weight of gaseous oxygen.

Example 4

A reactor was prepared from a 2.54 cm. diameter glass column having a volume of 400 ml. The column had a chromel wire heating coil wrapped about its outer surface. The coil was insulated for heat loss by means of an asbestos cover. Air was then passed upward through a fritted glass plate located at the bottom of the column at a velocity of 20 cm./sec. Thereafter 120 g. of finely divided potassium carbonate peroxide (active oxygen content of 6.31%) was charged into the column. The temperature of the charge was raised to 110° C. over a two-hour period by control of an electric current passing through the heating coil. The maximum humidity content of the overhead gas stream was about 20 mg./liter. After the two-hour reaction period the contents of the column were removed and a powdery material was recovered that effervesced on contact with water. On analysis this product contained 0.66% by weight of gaseous oxygen.

Example 5

One hundred grams of a mixture of 72.3% by weight of sodium tripolyphosphate peroxide and 27.7% of sodium pyrophosphate peroxide (containing 2.8% active oxygen) having a bulk density of 0.56 g./ml. was charged into an electrically heated glass column such as described in Example 4. Air was passed upward through the base of the column at a velocity of 12 cm./sec. The charged particles, which had a diameter less than 2 mm., were heated to a temperature of 120° C. over a period of two hours by regulating the electric current that was passed through the heating coil. When the particles reached a temperature of 120° C. they were maintained at this temperature for one hour. Throughout the thermal conversion the maximum humidity content of the overhead gas stream was about 20 mg./liter. Thereafter the gas stream was discontinued and the product was discharged from the column. The product was found to be a powdery material that effervesced on contact with water and which on analysis contained 0.45% gaseous oxygen.

Example 6

A 100 g. charge of sodium tripolyphosphate peroxide (containing 1.75% active oxygen) was charged into a reaction column identical to that described in Example 4. Air was passed upward through the base of the column at a rate of 18 cm./sec. The particles of sodium tripolyphosphate peroxide, which had a diameter below about 2 mm., were suspended in the upward flowing gas stream. The temperature of the particles was then raised by applying an electric current to the heating coil so that a temperature of 115° C. was reached after one and one-half hours. Thereafter the particles were maintained at 115° C. for a total of 20 minutes. During this thermal conversion the maximum humidity content of the overhead gas stream was about 20 mg./liter. Thereafter, the contents of the column were removed and a powdery material was recovered which effervesced on contact with water. On analysis this product contained 0.64% by weight of gaseous oxygen.

Example 7

A 100 g. charge of a mixture of 31.1% by weight of tetrasodium pyrophosphate peroxide and 68.9% "Hexaphos" (a polyphosphate compound containing a 13 member phosphorous chain) was ground so that it passed through a No. 40 U.S. Standard sieve. The charge was then placed in a glass reaction column identical to that described in Example 4. Air was passed upward through the fritted glass plate in the base of the column at a velocity of 12 cm./sec. The gas flow suspended the charged particles and these particles were heated by passing an electric current through the heating coil surrounding the glass column. The temperature of the particles was raised to 170° C. over a period of an hour and maintained at this temperature for an additional 20 minutes. During this thermal conversion the maximum humidity content of the overhead gas stream was about 17 mg./liter. Thereafter the contents of the column were removed and a powdered product was recovered that effervesced on contact with water. On analysis this product was found to contain 0.4% by weight of gaseous oxygen.

In the above example the "Hexaphos" was inert with respect to the thermal conversion and was added with the tetrasodium pyrophosphate peroxide to demonstrate that the presence of inert particles along with the peroxygen compound being thermally converted is operative and feasible.

Example 8

The procedure of Example 6 was repeated using urea peroxide in place of sodium tripolyphosphate peroxide. Further, the temperature of conversion was 40° C. and this was maintained for 20 hours. Thereafter the resulting powdered product was removed and was found to effervesce and give off gaseous oxygen on contact with water.

Example 9

The procedure of Example 6 was repeated using sodium persulfate (sodium peroxydisulfate) in place of sodium tripolyphosphate peroxide. The temperature of conversion was 200° C. and the sample was maintained at this temperature for two hours. The maximum humidity content of the overhead gas stream was about 0.1 mg./liter. Thereafter the resultant powdered product was removed and was found to effervesce and give off gaseous oxygen on contact with water.

Example 10

The procedure of Example 6 was repeated using lithium peroxydiphosphate in place of sodium tripolyphosphate peroxide. The temperature of conversion was 150° C. and the sample was maintained at this temperature for two hours. Thereafter the resultant powdered product was removed and was found to effervesce and give off gaseous oxygen on contact with water.

Example 11

The procedure of Example 6 was repeated using sodium percarbonate in place of sodium tripolyphosphate peroxide. The temperature of conversion was 110° C. and the sample was maintained at this temperature for three hours. Thereafter the resultant powdered product was removed and was found to effervesce and give off gaseous oxygen on contact with water.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of converting a compound to a product which effervesces and gives off gaseous oxygen when in contact with water, which comprises suspending particles of a compound selected from the group consisting of:
   (a) salts whose cation is selected from the group consisting of an alkali metal, ammonium and an alkaline earth metal, and whose anion is selected from the group consisting of a persulfate, perphosphate and percarbonate;
   (b) salts whose cation is selected from the group consisting of an alkali metal, ammonium and an alkaline earth metal, whose anion is derived from a polybasic acid, and wherein said salts contain bound hydrogen peroxide in their crystal structure; and
   (c) a compound selected from the group consisting of amines, amides and imides that has hydrogen peroxide hydrogen-bonded thereto
in a stream of inert gas and maintaining the average distance between the particles at least 0.07 times the diameter of the particles, heating said compound while in a suspended state to a temperature of from 40° to 300° C., but below the melting point of the particles during conversion, maintaining the water vapor content of said inert gas at below an amount which will degrade the product, and continuing said heating until any water evolved during conversion has been removed, and recovering a product which effervesces and gives off oxygen when in contact with water.

2. Process of claim 1 wherein the water vapor content of the inert gas is not above 20 mg./liter.

3. Process of claim 1 wherein said inert gas is air.

4. Process of claim 1 wherein said compound is heated to a temperature of from 40° to 200° C.

5. Process of claim 1 wherein said compound is sodium persulfate and wherein said compound is heated while in the suspended state to a temperature of from 40° to 200° C. and wherein the water vapor content of the inert gas surrounding the suspended particles is no higher than about 20 mg./liter.

6. Process of converting a salt to a product which effervesces and gives off gaseous oxygen when in contact with water, which comprises suspending particles of a salt whose cation is selected from the group consisting of an alkali metal, ammonium and an alkaline earth metal, and whose anion is derived from a polybasic acid, and wherein said salt contains bound hydrogen peroxide in its crystal structure, in a stream of inert gas and maintaining the average distance between the particles at least 0.07 times the diameter of the particles, heating said salt while in a suspended state to a temperature of from 40° to 300° C., but below the melting point of the particles during the conversion until water evolved during conversion has been removed, and recovering a product which effervesces and gives off oxygen when in contact with water.

7. A novel composition of matter that effervesces and gives off gaseous oxygen when in contact with water, said composition being produced by suspending particles of a compound selected from the group consisting of
   (a) salts whose cation is selected from the group consisting of an alkali metal, ammonium, and an alkaline earth metal, and whose anion is selected from the group consisting of a persulfate, perphosphate and percarbonate;
   (b) salts whose cation is selected from the group consisting of an alkali metal, ammonium and an alkaline earth metal, whose anion is derived from a polybasic acid, and wherein said salts contain bound hydrogen peroxide in their crystal structure; and
   (c) a compound selected from the group consisting of amines, amides and imides, that has hydrogen peroxide hydrogen-bonded thereto
in a stream of inert gas and maintaining the average distance between the particles at least 0.07 times the diameter of the particles, heating said compound while in a suspended state to a temperature of from about 40° to 300° C., but below the melting point of the particles during conversion, maintaining the water vapor content of said inert gas at below an amount which will degrade the product, and continuing said heating until any water evolved during conversion has been removed, and recovering a product wherein said oxygen is bound to said product in a form wherein said oxygen is liberated as gaseous oxygen when said product comes in contact with water.

References Cited

UNITED STATES PATENTS

| | | | |
|---|---|---|---|
| 2,491,789 | 12/1949 | Young | 23—60 X |
| 1,950,320 | 3/1934 | Muller | 23—60 X |
| 2,308,992 | 1/1943 | Mertens. | |
| 2,979,464 | 4/1961 | Pistor | 23—60 X |
| 3,311,446 | 3/1967 | Kegelart | 23—60 |

HERBERT T. CARTER, *Primary Examiner.*

U.S. Cl. X.R.

23—505, 62, 105, 114; 260—610; 252—186